ns is United States Patent Office 3,298,627
Patented Jan. 17, 1967

3,298,627
COILER MANDRELS
Clifford Sturdy, Chesterfield, and Ronald Jackman, Wales, Sheffield, England, assignors to Davy and United Engineering Company Limited, Sheffield, England
Filed Feb. 12, 1965, Ser. No. 432,270
Claims priority, application Great Britain, Feb. 27, 1964, 8,111/64
4 Claims. (Cl. 242—72.1)

This invention relates to expansible coiler mandrels, and an object of the invention is to provide a radially movable segment of a mandrel with clamping means capable of accommodating strip material of comparatively widely varying thicknesses.

Preferably the thrust member is arranged to move through a distance greater than the distance moved by the first segment by an amount at least equal to the thickness of the thickest strip to be clamped in the clamping means.

Preferably the clamping means includes further resilient means in compression between the movable jaw and the first segment to urge the jaw inwardly relative to the segment. The further resilient means always exerts less inward force on the jaw than the outward force of the first resilient means in the expanded condition of the mandrel, and exerts a greater inward force than the outward force of the first resilient means in the unexpanded condition of the mandrel.

Means are also provided to urge the segments inwardly when the shaft is moved in a direction opposite to said one direction.

Figure 1:
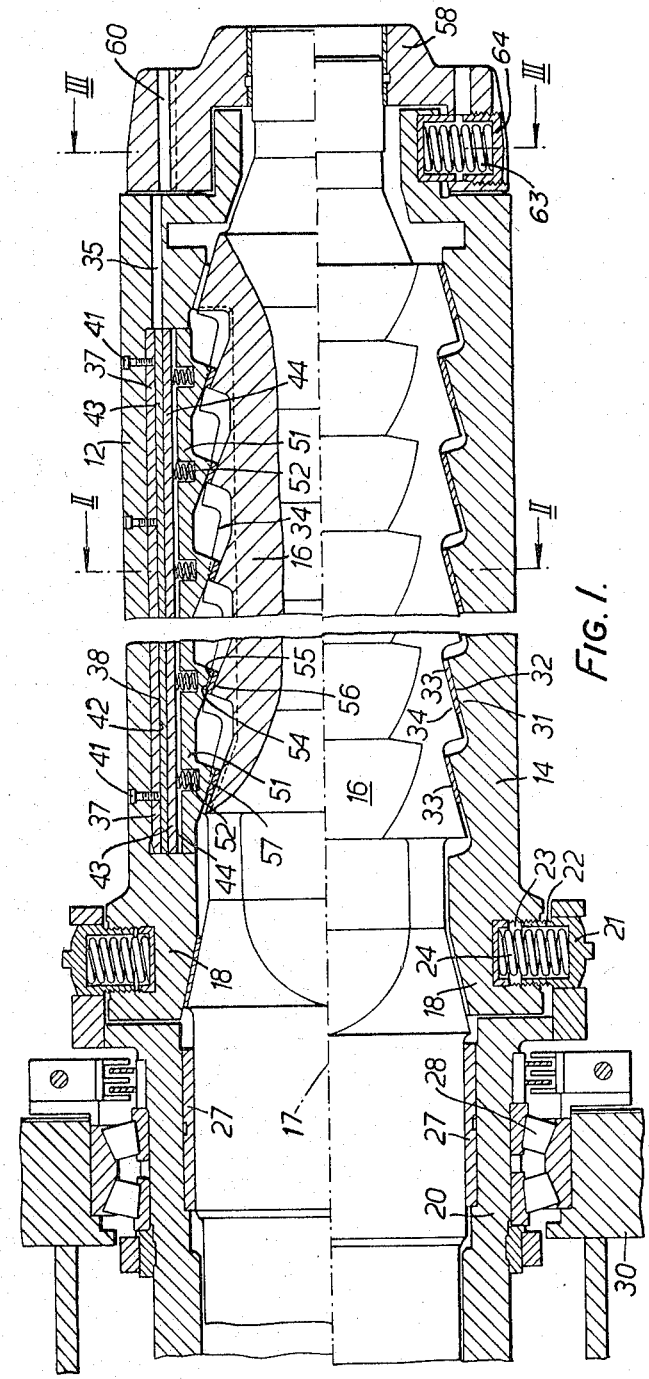
Figure 2:
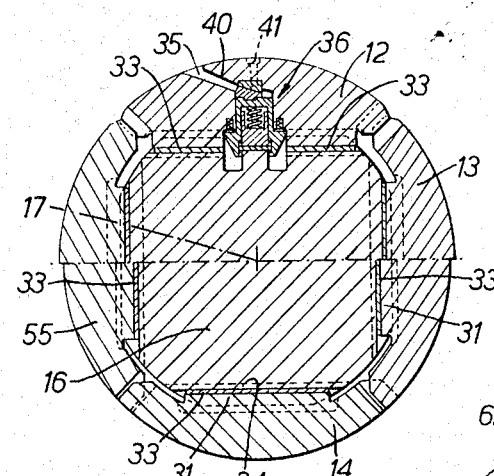
Figure 3:
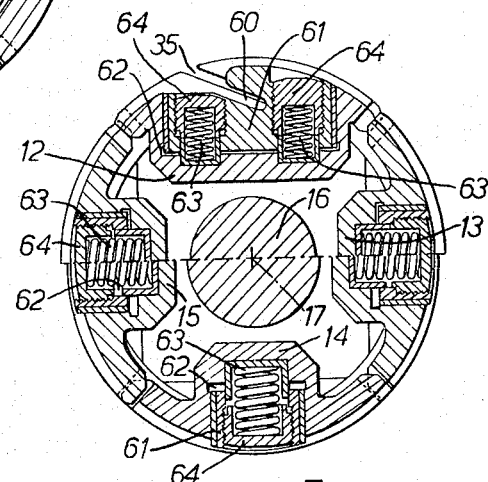
Figure 4:
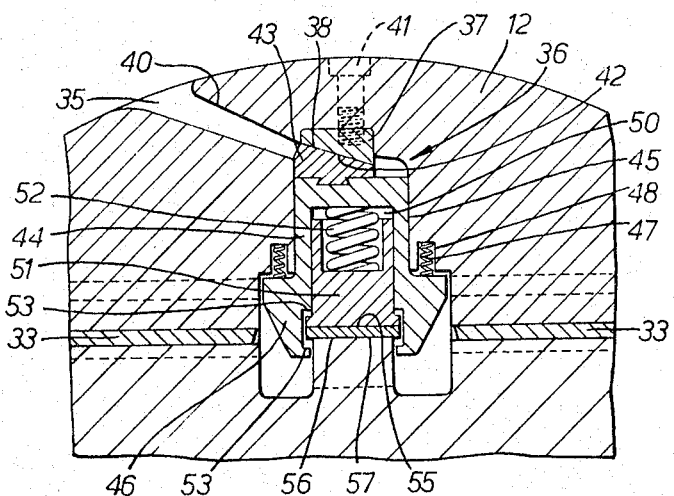

An embodiment of coiler mandrel in accordance with the invention will now be described, by way of example only, with reference to the accompanying drawings of which:

FIGURE 1 is an axial section through a coiler mandrel,
FIGURE 2 is a section on the line II—II of FIGURE 1,
FIGURE 3 is a section on the line III—III of FIGURE 1,
FIGURE 4 is an enlarged view of part of FIGURE 2.

The mandrel comprises four segments 12, 13, 14 and 15, carried on a shaft 16 which is reciprocable relative to the segments, through a distance of 1⅞ inches, in the direction of its axis 17. The means for reciprocating the shaft are not shown but these may be of any standard form. The shaft is of substantially rectangular cross-section with the corners rounded. The drive end of each segment is formed with an extension 18 secured to a mandrel sleeve 20 so as to prevent relative axial or rotational movement between the segments and the sleeve 20 while allowing radial expansion and contraction of the segments. Secured to the end of the sleeve 20 are four similar inwardly opening cup-shaped members 21, the mouth defining flanges 22 of each of which extend slidably into an outwardly opening circular recess 23 in an extension 18. A spring 24 is held in compression between each member 21 and an extension 18 to urge the segments inwardly.

The sleeve 20 is hollow and carries the shaft 16 on bushes 27 secured to its inner surface. The sleeve 20 is mounted in roller bearings 28 on a support structure 30.

The inner surface of each segment is formed with a plurality of wedges 31 each having a wedge surface 32, making an angle of 14 degrees with the axis of the shaft 16, carrying a wear strip 33, and co-operating with corresponding wedges 34 on the outer surface of the shaft 16. It will be seen that the arrangement is such that when the shaft is moved to the right, in the drawing, the segments are moved radially outwardly, to the position shown in the upper half of the figures.

Segment 12 is provided with a slot 35 extending substantially along its whole length, and clamping means 36 for receiving and securing the end of a strip to be wound on the mandrel. The clamping means includes an outer member 37 having a gripping surface 38 co-extensive with the outer slot defining surface 40, and secured to the segment by bolts 41. The gripping surface 38 co-operates with a gripping surface 42 on a member 43 secured by a dove-tailed joint to a clamping jaw 44 which is radially slidable in a slot 45 in the segment 12. The slot 45 opens at its outer end into the slot 35 and at its inner end is enlarged to receive the enlarged head 46 of the clamping jaw 44. Springs 47 located in recesses 48 in the segment 12 are held in compression between the segment and the enlarged head 46 of the clamping jaw 44, to urge the jaw inwardly. Clamping jaw 44 is formed with an inwardly opening recess 50 in which a thrust member 51 is radially slidably located. A spring 52 is held in compression between the thrust member and the jaw to urge the jaw outwardly and the thrust member inwardly. Spring 47 is arranged to exert less inward force on jaw 44 than the outward force of spring 52 when the mandrel is expanded. Stops 53 limit their relative movement. The inner surface of thrust member 51 is formed with a plurality of wedges 54 having wedge surfaces 55 making an angle of 22 degrees with the axis of shaft 16, and co-operating with similar wedges 56 on the shaft 16. Hardened wear strips 57 are secured to the surface 55. It will be seen that movement of the shaft 16 to the right in FIGURE 1, will cause the thrust member 51 to move radially outwardly through a greater distance than the segment 12 moves outwardly, thus tending to close the gripping surfaces 38, 42. If a strip end is between the gripping surfaces the spring 52 will be further compressed.

The free end of shaft 16 FIGURES 1 and 3, is of reduced and circular cross-section and has secured thereto a cap member 58. Cap member 58 is formed with a slot 60 aligned with the slot 35 in the unexpanded condition of the mandrel to allow the coil to be withdrawn. Extensions 61 of the cap member 58 are slidably received in outwardly facing recesses 62 of the segments. Compression springs 63 are held between the segments and cup-shaped members 64 secured to the extensions 61, and urge these segments inwardly. Thus the cap member 58 is held against axial or rotational movement relative to the segments but allows relative radial movement.

In operation the mandrel is collapsed by withdrawing the shaft 16 to the left in FIGURE 1, the end of the strip to be wound is inserted in the slot 35 between the gripping surfaces 38, 42 and the shaft 16 is moved to the right which serves both to expand the mandrel by moving the segments radially outwardly and to grip the end of the strip between the surfaces 38 and 42.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:
1. An expansible coiler mandrel comprising a plurality of radially movable segments carried on a shaft which is reciprocable along its axis relative to the segments, the inner surface of each segment being formed with a plurality of first wedges cooperating with corresponding wedges on the outer surface of the shaft such that movement of the shaft in one direction along its axis causes the segments to move radially outwardly, at least a first of the segments being provided with a slot and clamping means, for receiving and clamping the end of a strip to be wound on the mandrel, said clamping means received in an opening having a part formed in said shaft and a part formed in said first segment, a thrust member received in said opening, the clamping means including a radially movable jaw engaging through first resilient means with said thrust member, and received in that part of said opening formed in said first segment, mounted for radial sliding movement in the first segment, the inner surface of the thrust member being formed with a plurality of wedges, each having a greater wedge angle relative to the axis of the shaft than the first wedges, and cooperating with corresponding wedges on the outer surface of the shaft and received in that part of the opening formed in said shaft such that movement of the shaft in said one direction moves the thrust member radially outwardly through a greater distance than the first segment, said thrust member being arranged to move through a radial distance greater than the distance moved by the first segment by an amount at least equal to the thickness of the thickest strip to be clamped in the clamping means, and the clamping means includes second resilient means held in compression between the movable jaw and the first segment so as to urge the jaw inwardly relative to the segment.

2. An expansible coiler mandrel according to claim 1 comprising four radially movable segments carried on said shaft.

3. A mandrel according to claim 1 in which the second resilient means is arranged to exert less inward force on the jaw than the outward force of the first resilient means in the expanded condition of the mandrel, and to exert a greater inward force than the outward force of the first resilient means in the unexpanded condition of the mandrel.

4. A mandrel according to claim 1 in which one end of each segment is connected to a rotatably mounted sleeve on which the shaft is supported, the connections being arranged to prevent relative axial or rotational movement between the sleeve and the segments but to allow relative radial movement.

References Cited by the Examiner
UNITED STATES PATENTS

| | | | |
|---|---|---|---|
| 2,564,482 | 8/1951 | Kentis | 242—72.1 |
| 2,755,031 | 7/1956 | Russell | 242—72.1 |
| 2,969,202 | 1/1961 | Martt | 242—72.1 |

STANLEY N. GILREATH, *Primary Examiner.*

FRANK J. COHEN, *Examiner.*

N. L. MINTZ, *Assistant Examiner.*